United States Patent
Brown et al.

(10) Patent No.: US 9,144,090 B2
(45) Date of Patent: Sep. 22, 2015

(54) METHOD AND DEVICE FOR REGULATING EMISSION IN A WIRELESS TELECOMMUNICATION NETWORK

(75) Inventors: Patrick Brown, Cagnes sur Mer (FR); Jérôme Galtier, Nice (FR)

(73) Assignee: France Telecom, Paris (FR)

( * ) Notice: Subject to any disclaimer, the term of this patent is extended or adjusted under 35 U.S.C. 154(b) by 33 days.

(21) Appl. No.: 13/638,476

(22) PCT Filed: Mar. 30, 2011

(86) PCT No.: PCT/FR2011/050716
§ 371 (c)(1),
(2), (4) Date: Nov. 2, 2012

(87) PCT Pub. No.: WO2011/121241
PCT Pub. Date: Oct. 6, 2011

(65) Prior Publication Data
US 2013/0051343 A1 Feb. 28, 2013

(30) Foreign Application Priority Data
Mar. 31, 2010 (FR) ...................................... 10 52386

(51) Int. Cl.
*H04W 74/08* (2009.01)
(52) U.S. Cl.
CPC .................................. *H04W 74/0841* (2013.01)
(58) Field of Classification Search
CPC ................................................. H04W 74/0808
USPC .................................................. 370/331–338
See application file for complete search history.

(56) References Cited

U.S. PATENT DOCUMENTS

| | | | |
|---|---|---|---|
| 2005/0094558 A1* | 5/2005 | Lu | 370/229 |
| 2005/0169221 A1 | 8/2005 | Bennett | |
| 2008/0026783 A1* | 1/2008 | Lee | 455/522 |
| 2009/0059792 A1* | 3/2009 | Itoh | 370/235 |
| 2009/0109993 A1 | 4/2009 | Galtier | |
| 2009/0213815 A1 | 8/2009 | Sherman et al. | |
| 2010/0135210 A1* | 6/2010 | Kim et al. | 370/328 |

FOREIGN PATENT DOCUMENTS

WO    2007051946 A1    5/2007

OTHER PUBLICATIONS

International Search Report and Written Opinion dated May 26, 2011 for corresponding International Application No. PCT/FR2011/050716, filed Mar. 30, 2011.
French Search Report and Written Opinion dated Nov. 9, 2010 for corresponding French Patent Application No. 1052386, filed on Mar. 31, 2010.
English Translation of the Written Opinion of the International Searching Authority dated Oct. 2, 2012 for corresponding International Application No. PCT/FR2011/050716, filed Mar. 30, 2011.

* cited by examiner

*Primary Examiner* — Brandon Renner
(74) *Attorney, Agent, or Firm* — David D. Brush; Westerman, Champlin & Koehler, P.A.

(57) ABSTRACT

A method and apparatus are provided for regulating sending implemented by a station during a tournament for access to a wireless communication network. The method includes, in the course of a round of the tournament: a step of reception of a first signal, sent by another station and indicating that this other station has obtained during the round of the tournament an authorization to send a data packet, a step of sending of a second signal indicating that the station has received the first signal.

10 Claims, 2 Drawing Sheets

METHOD AND DEVICE FOR REGULATING EMISSION IN A WIRELESS TELECOMMUNICATION NETWORK

CROSS-REFERENCE TO RELATED APPLICATIONS

This Application is a Section 371 National Stage Application of International Application No. PCT/FR2011/050716, filed Mar. 30, 2011, which is incorporated by reference in its entirety and published as WO 2011/121241 on Oct. 6, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of wireless telecommunication networks, in particular wireless local networks or WLANs (from the English "Wireless Local Access Network") in accordance with the family of IEEE 802.11 standards.

Such networks are also named Wi-Fi networks. They are used, in numerous applications, to network stations (for example computers, personal assistants and peripherals).

BACKGROUND OF THE DISCLOSURE

The 802.11 standard defines in the document "IEEE 802.11a-1999, IEEE 802.11b-1999, IEEE-802.11d-2001, Part 11: wireless LAN medium access control (MAC) and physical layer (PHY) specifications" a method for regulating traffic in a wireless network. This method uses a system of congestion windows (Congestion Window "CW") to regulate this traffic. According to this standard, to determine the instant at which to send a data packet, a station draws a chance random number between 0 and CW−1, the value CW being an integer lying between two values $CW_{min}$ and $CW_{max}$ specified by the 802.11 standard.

This value CW serves as countdown counter for the sending of the packet, this counter being deferred if the station notes that another station is currently sending. Unfortunately, this congestion windows system generates a significant number of collisions on the wireless network, this being manifested, from the user's point of view, by a significant loss of bandwidth.

Another mechanism known by the name "tournament scheme" may be used by the various stations to regulate the sending of packets and limit the collision rate. This tournament scheme is described in the document by the authors Z. Abichar and M. Chang, entitled "CONTI: Constant Time Contention Resolution for WLAN Access", IFIP Networking 2005.

The tournament scheme consists in organizing a sort of tournament between the stations having to send a packet. A tournament is composed of a certain number of selection rounds, each executed for a time interval of predefined duration allowing each station to have time to hear the sending of any other. This duration can typically be equal to the duration of the time interval dubbed "SlotTime" which, according to the IEEE 802.11 standard, is defined as an elementary interval in the congestion window contention resolution procedure. At the start of the tournament, all the stations having to send a packet may be permitted to send this packet. At each selection round, one or more stations may be deleted from the list of the stations permitted to send, depending on whether a permission or a prohibition to send is allotted to them during this selection round. On completion of the tournament, only the stations not eliminated are permitted to send. If several stations remain in the running on completion of the tournament, they send at the same time thus causing a collision and therefore disturbed reception with impossibility of correctly receiving the data packets sent. These stations will then have to participate in the next tournament to attempt to send these packets again.

The tournament scheme in a WLAN network allows effective use of bandwidth and a noticeable reduction in collisions and access time, thereby rendering these networks compatible with multimedia applications requiring high transmission bitrates.

However the effectiveness of this scheme is reduced in the presence of the phenomenon of hidden stations. This phenomenon arises for example when 3 stations A, B, and C are located in such a way that station B hears the signals sent by stations A and C, but that the latter do not hear the signals sent by the other. In such a situation, if station A is permitted to send a packet and sends a signal indicating its intention to send, station C will not hear this signal. Consequently, if station C is also permitted to send a packet, it will send this packet, believing it to be the only one to send a packet, and will cause a collision with the packet sent by station A.

SUMMARY

An exemplary embodiment of the invention relates, according to a first aspect, to a method of regulating sending implemented by a station during a tournament for access to a wireless communication network, the method comprising in the course of a selection round of said tournament:
  a step of receiving a first signal, sent by another station and indicating that this other station has during said selection round obtained permission to send a data packet,
  a step of sending a second signal indicating that said station has received the first signal.

The method according to an embodiment of the invention makes it possible to propagate from station to station, the information according to which one of the stations benefits from a permission to send a packet. Consequently, when a station B masks station A for station C, station C is nonetheless informed of the permission to send from which station A benefits. Collisions between the packets sent by stations A and C are thus avoided in cases where these two stations would be permitted to send simultaneously. This is also beneficial for station B which could be inconvenienced by an undesirable sending of one of stations A or C.

In one embodiment, an inter-station casting decision procedure is used: it is aimed at determining which stations will be able to compete for access to this radio network and with which tournament mode.

Thus, in this embodiment, prior to the implementation of a tournament, said station implements a casting decision procedure so as to determine whether or not said station will participate in a tournament in which any station receiving said first signal must send said second signal.

Such a casting decision procedure makes use for example on the one hand, of signals of a first type indicating that a station desires to participate in a tournament, either in a tournament with echo or in a tournament without echo, and, on the other hand, of signals of a second type indicating that a station has or has not heard one of the signals of the first type.

According to a first variant embodiment of the method according to the invention, prior to the implementation of a tournament, said station sends a third signal signifying that said station desires to start a tournament in which any station receiving said first signal must send said second signal. Preferably, prior to the dispatching of the third signal, said station sends a signal indicating that said station desires to participate in a tournament.

In another situation, applicable to a station implementing an embodiment of the invention, prior to the implementation of a tournament, this station sends a fourth signal indicating that said station has received a third signal sent by another station signifying that this other station desires to start a tournament in which any station receiving said first signal must send said second signal. Preferably, prior to the dispatching of the fourth signal, said station sends a signal indicating that said station desires to participate in a tournament.

According to a second variant embodiment, prior to the implementation of a tournament, said station sends a fourth signal indicating that said station has not received any third signal signifying that another station desires to start a tournament in which any station receiving said first signal must send said second signal.

These various casting decision procedures make it possible for stations implementing an embodiment of the invention to access the same radio medium as stations not implementing an embodiment of the invention, without there being conflict between these stations.

The various embodiments and variants mentioned hereinabove are mutually combinable for the implementation of the invention.

Correlatively, an embodiment of the invention relates to a device for regulating sending, implementing a tournament for access to a wireless communication network, the device comprising, means for receiving, during a selection round of said tournament, a first signal, sent by another device, indicating that this other device has during said selection round obtained permission to send a packet, means for sending a second signal indicating that said device has received the first signal.

The stated advantages for the method according to an embodiment of the invention are directly transposable to the device according to an embodiment of the invention.

More generally, the device according to an embodiment of the invention comprises means for implementing the steps of the method according to an embodiment of the invention. This device for regulating sending is integrated for example into telecommunication equipment of packet sending station type.

According to a preferred implementation, the various steps of the method according to an embodiment of the invention are implemented by software or computer program, this software comprising software instructions intended to be executed by a data processor of a device for regulating sending according to an embodiment of the invention and being designed to control the execution of the various steps of this method.

Consequently, an embodiment of the invention is also aimed at a program, able to be executed by a computer or by a data processor, this program comprising instructions for controlling the execution of the steps of a method such as mentioned hereinabove.

This program can use any programming language, and be in the form of source code, object code, or of code intermediate between source code and object code, such as in a partially compiled form, or in any other desirable form.

An embodiment of the invention is also aimed at an information medium readable by a data processor, and comprising instructions of a program such as mentioned hereinabove.

The information medium may be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium may be a transmissible medium such as an electrical or optical signal, which may be conveyed via an electrical or optical cable, by radio or by other means. The program according to an embodiment of the invention may be in particular downloaded from a network of Internet type.

Alternatively, the information medium may be an integrated circuit into which the program is incorporated, the circuit being adapted for executing or to be used in the execution of the method in question.

According to one embodiment, the invention is implemented by software and/or hardware components. In this respect, the term "module" can correspond in this document either to a software component, or to a hardware component or to a set of hardware and software components.

A software component corresponds to one or more computer programs, one or more subroutines of a program, or in a more general manner to any element of a program or of a piece of software able to implement a function or a set of functions, according to what is described hereinbelow for the module concerned. Such a software component is executed by a data processor of a physical entity (terminal, server, gateway, set-top-box, router, etc.) and is able to access the hardware resources of this physical entity (memories, recording media, communication buses, electronic input/output cards, user interfaces, etc.).

In the same manner, a hardware component corresponds to any element of a hardware set able to implement a function or a set of functions, according to what is described hereinbelow for the module concerned. This can involve a programmable hardware component or a component with integrated processor for the execution of software, for example an integrated circuit, a chip card, a memory card, an electronic card for the execution of firmware, etc.

The subject of an embodiment of the invention is also a signal, intended to be sent by a device for regulating sending implementing a tournament for access to a wireless communication network, said signal indicating that said device has received during a selection round of said tournament another signal, sent by another device, indicating that this other device has during said selection round obtained permission to send a data packet.

An embodiment of the invention is also aimed at an information medium readable by a computer or data processor, and comprising a signal according to an embodiment of the invention.

The information medium may be any hardware means, entity or device, capable of storing a signal. For example, the medium can comprise a storage means, such as a ROM or RAM memory, for example a CD ROM disk or else a magnetic recording means, for example a diskette ("floppy disk" in English) or a computer hard disk.

Moreover, the information medium may be a transmissible medium in the form of a carrier wave such as an electromagnetic signal (electrical, radio or optical signal), which may be conveyed via an appropriate, wire-based or non-wire-based transmission means: electrical or optical cable, radio or infrared link, or by other means.

BRIEF DESCRIPTION OF THE DRAWINGS

Other aims, characteristics and advantages will be apparent through the description which follows, given solely by way of nonlimiting example, and with reference to the appended drawings in which.

DETAILED DESCRIPTION OF ILLUSTRATIVE EMBODIMENTS

Figure 1:
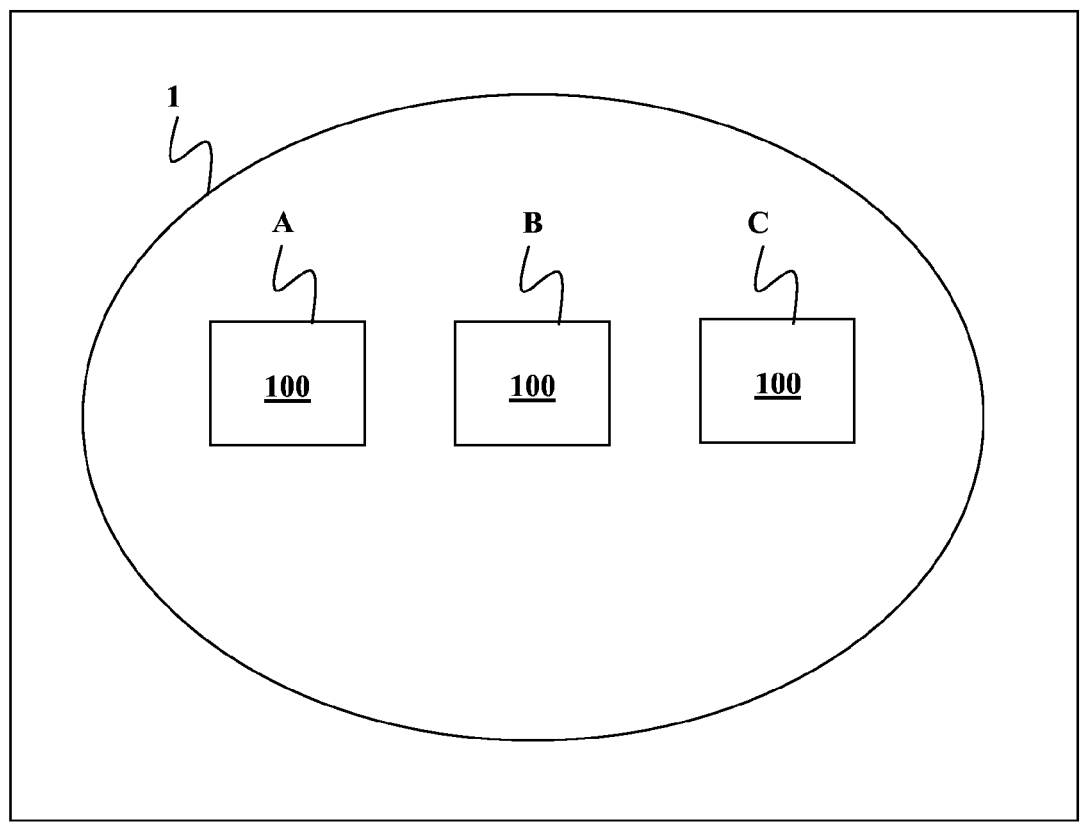
FIG. 1 represents a wireless telecommunication network with stations in accordance with the invention in an embodiment.

FIG. 1 represents a wireless telecommunication network 1 in which stations A, B, C in accordance with an embodiment of the invention are deployed. Each of these stations A, B, C comprises a device for regulating sending 100 in accordance with an embodiment of the invention.

Figure 2:
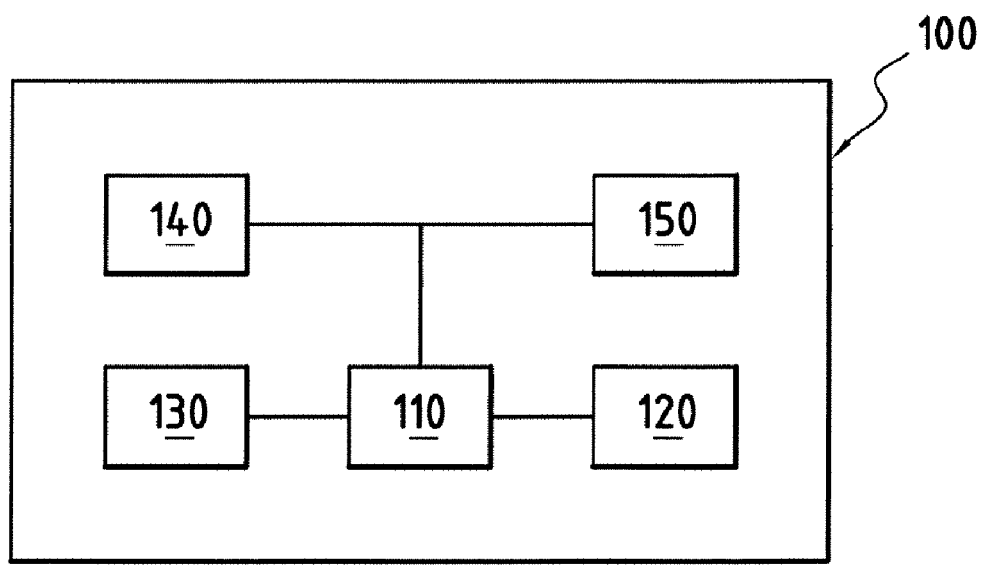
FIG. 2 represents a device for regulating sending in accordance with the invention in an embodiment.

In the mode illustrated in FIG. 2, the device 100 according to an embodiment of the invention comprises a processor 110, a random-access memory 120, a read-only memory of ROM type 130, a module 140 for access to the network 1, so as to send and receive packets and signals in the wireless telecommunication network 1 and a table of probabilities 150. These various elements are linked together by a bus system, not referenced. The means 140 for dispatching and receiving data packets and signals on the wireless telecommunication network 1 consist, in the example described here, of a card for access to the network 1 in accordance with the family of IEEE 802.11 standards.

For the implementation of an embodiment of the invention, use is made of the tournament scheme cited in the introduction.

In the tournament scheme, such as described by CONTI in the document referenced hereinabove, the permissions or prohibitions to send are allotted to the stations by using binary random variables having a Bernoulli distribution law. This distribution law is defined by a probability of drawing a permission to send. Such a probability is thus assigned to each station and to each selection round. The probabilities are chosen preferably in such a way that statistically the collision rate is as low as possible. A procedure for choosing the probabilities in an optimal manner is presented in the document "Analysis and optimization of mac with constant size congestion window for WLAN", by J. Galtier, Proceedings on the Third International Conference on Services and Networks communications", INRIA, Library of Congress Number 2007930108, August 2007.

According to a particular embodiment, described in patent document WO2007/051946, the probabilities assigned to the various stations during a selection round can be dependent on the permissions or prohibitions to send drawn in the previous selection rounds, so as to minimize the collision rate.

The stations A, B, C each comprise a device for regulating sending 100 which allows the implementation of a method of regulating sending according to an embodiment of the invention.

In the subsequent description the following notation will be used:
  k is the index identifying the selection round in the course of a tournament;
  $k_{max}$ is the maximum number of selection rounds for a tournament;
  r is a binary random variable;
  r(k) is the value of the binary random variable r drawn in the selection round of index k; r(k) belongs to the set {0,1}, the value "1" usually being representative of a permission to send, while the value "0" is representative of a prohibition to send.

Figure 3:
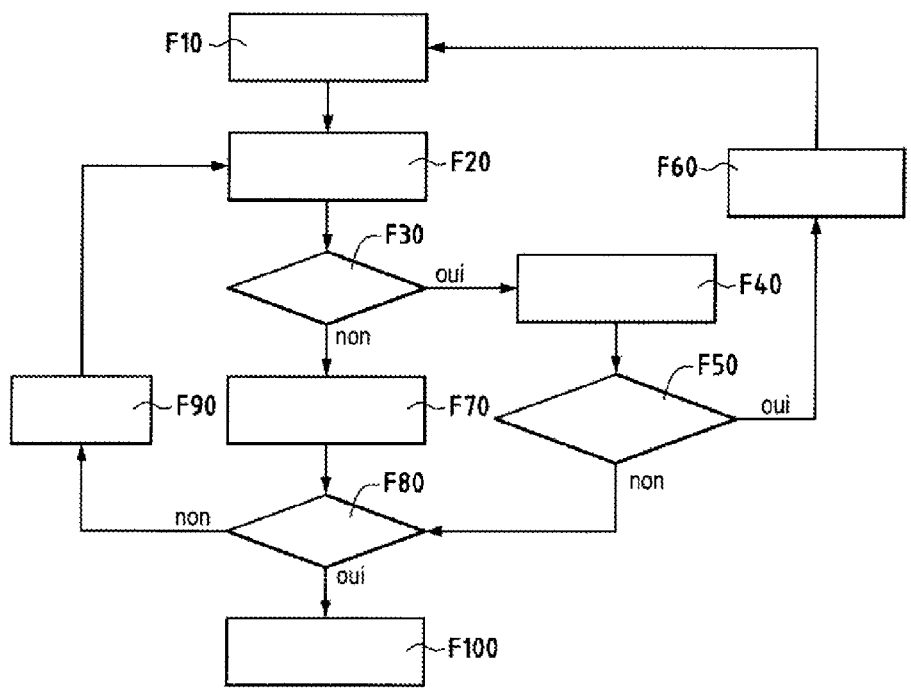
FIG. 3 represents, in flowchart form, the main steps of a method of regulating sending known in the prior art.

The main steps F10 to F100 of a method of regulating sending according to the known tournament scheme are described with reference to FIG. 3. This method is implemented by the sending regulating device 100 of a station A, B or C having a data packet to be sent through the network 1. All the stations having a data packet to be sent implement this same method simultaneously, without mutual consultation or interrogation, other than what is described in the steps described hereinbelow, being necessary between these stations.

The method of regulating sending according to the known tournament scheme is described for a station B. It corresponds to what is called a tournament: it is repeated by each station as long as it has packets to be sent. The stations having packets to be sent all start at the same instant the procedure for contention resolution by implementation of a tournament, this instant being dependent on a criterion analogous to that used for the congestion window system according to the IEEE 802.11 standard, that is to say after a predefined time period DIFS1 (which may be different from the DIFS (DCF Inter Frame Space) time period defined in the 802.11 standard).

As already indicated in the introduction, a tournament is composed of a certain number of selection rounds, each executed for a time interval of predefined duration allowing each station to have time to hear the sending of any other.

At the start of the tournament, all the stations having to send a packet may be permitted to send this packet. At each selection round, one or more stations may be deleted from the list of the stations permitted to send, depending on whether a permission or a prohibition to send is allotted to them during this selection round.

On completion of the tournament, only the stations not eliminated are permitted to send. If several stations remain in the running on completion of the tournament, they send at the same time thus causing a collision and therefore disturbed reception with impossibility of correctly receiving the data packets sent. These stations will then have to participate in the next tournament to attempt to send these packets again.

A selection round corresponds to the execution of steps F10 to F90 described in detail hereinbelow.

In the course of a first step F10, the station B initializes a variable k to the value 1, this variable representing the index of the current selection round.

This initialization step F10 is followed by a step F20 of drawing a value r(k) of a binary random variable r, associated with the station for the current selection round of index k. The probability that this binary random variable r(k) takes, in the selection round of index k, the predetermined value "1" is denoted p(k). According to one embodiment, this probability p(k) depends on the values drawn in the previous selection rounds. The probability that this binary random variable r(k) takes, in round k, the predetermined value "0" is therefore (1−p(k)).

This step F20 of drawing a random variable value is followed by a step F30 in the course of which a check is made to verify whether the binary value r(k) drawn is equal to "0".

If such is the case (case of a prohibition to send), this test F30 is followed by a step F40 in the course of which station B listens to the wireless telecommunication network to determine whether another station A or C has sent a signal S1 indicating that this other station A or C is permitted to send a data packet.

If such a signal S1 is detected (result of the test of step F50 positive), the method terminates with step F60, without station B having sent its data packet. In the course of this step F60, station B waits for the end of the selection rounds and the possible sending of a packet by another station A or C before again executing the initialization step F10 already described.

On the other hand, if in step F40 no signal S1 is detected (result of the test of step F50 negative), this test is followed by a test in step F80 in the course of which it is determined whether round k is the last selection round, this amounting to verifying whether the variable k is equal to the value $k_{max}$. If such is the case, station B sends its data packet in the course of a step F100.

On the other hand, if k is strictly less than $k_{max}$, the result of the test of step F80 is negative. This step is then followed by a step F90 in the course of which the value of the variable k is incremented by one unit, with a view to the execution of the following selection round.

If in the course of the test of step F30, it is determined that the binary value drawn is equal to the predetermined value 1 (case of a permission to send), this test F30 is followed by a step F70 of sending a signal indicating that station B desires to send a data packet on the network.

This step F70 of sending a signal is followed by step F80 already described in the course of which a check is made to verify whether the current selection round k is the last selection round. If such is the case, this test F80 is followed by step F100 of sending the data packet by the station B. On the other hand, if such is not the case, this test F80 is followed by the incrementation step F90 already described.

The incrementation step F90 is followed by a new execution of steps F20 to F80 already described, for the following selection round and according to the sequencing logic for chaining the steps together which has just been described.

Figure 4:
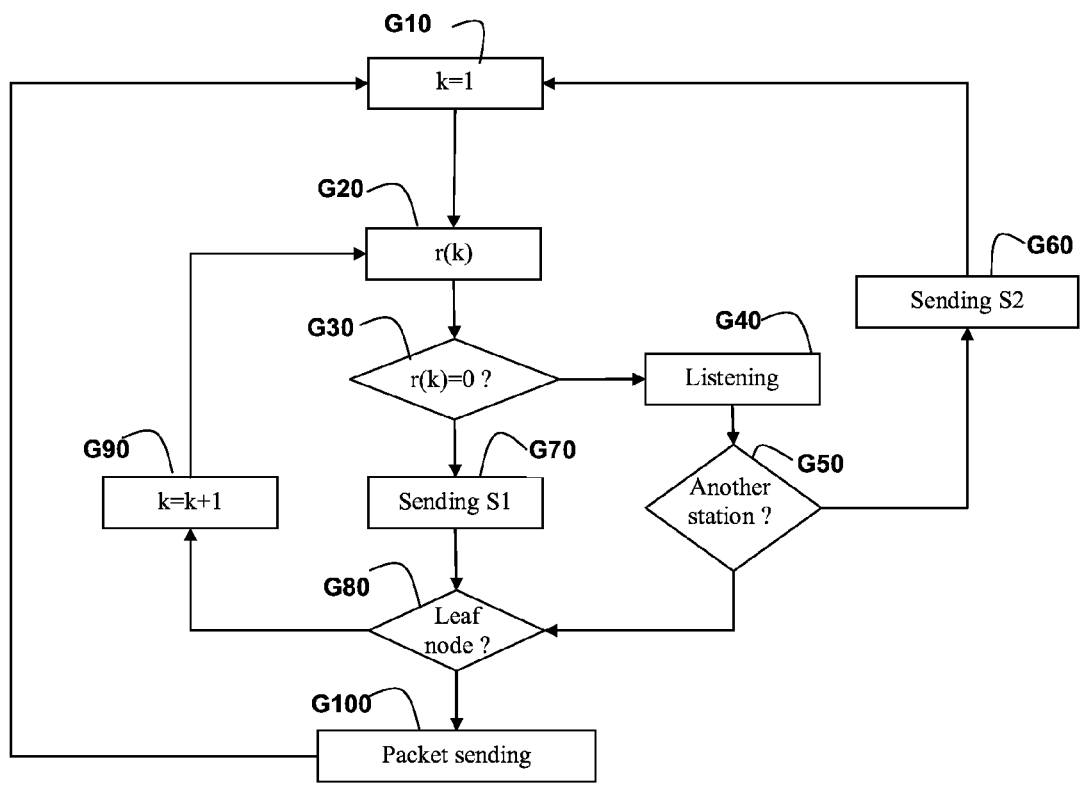
FIG. 4 represents, in flowchart form, the main steps of a method of regulating sending in accordance with the invention in an embodiment.

The method and the device according to an embodiment of the invention are now described in greater detail. The main steps G10 to G100 of a method of regulating sending according to an embodiment of the invention are described with reference to FIG. 4.

This method also uses the tournament scheme, but some of steps F10 to F100 described hereinabove are modified: this entails step F60 which is replaced with a step G60, the other steps G10 to G100 being identical respectively to steps F10 to F100 described in regard to FIG. 3.

In step G60, when a station B has not drawn a permission to send (r(k)=0 in step G30) and if, in step G50, station B has detected the sending of a signal S1, representative of an intention to send of another station (A for example), station B sends a signal S2 indicating that station B has detected such a signal S1. The signal S2 sent in step G60 by station B "echoes", as it were, the signal S1 sent by station A in step G70.

In an embodiment of the invention, two signals S1 and S2 are thus used:
 a signal S1 which indicates that the station sending this signal has drawn a permission to send and has the intention to send a packet;
 a signal S2, distinct from the signal S1, which indicates that the station sending this signal has detected the sending by another station of a signal S1: this signal S2 echoes as it were the signal S1 since it serves to propagate the information given by the signal S1.

Consequently, if the three stations A, B and C participate in one and the same tournament, station B hiding station A from station C and vice versa station C from station A: if station A benefits from a permission to send and sends a signal S1, C will not be able to detect this signal S1. On the other hand, station C will be able to detect the signal S2 echoing the signal S1: station C is therefore informed by station B that another station (A in this instance) has sent a signal S1.

In the subsequent description, we shall speak of a "tournament with echo" when, in the course of such a tournament, any station receiving the signal S1 must send the signal S2. In the same manner, we shall speak of a "tournament without echo" when, in the course of such a tournament, a station receiving the signal S1 does not send any signal S2.

It is possible that, among the stations accessing one and the same radio network, there are two categories of stations: on the one hand, stations implementing the tournament scheme with or without echo (category 1) and, on the other hand, stations not implementing the tournament scheme, but operating according to what is specified in the 802.11a, b, g or n standard (category 2).

Furthermore, in category 1 there may be: on the one hand, stations (category 1A) desiring to implement a tournament with echo, and, on the other hand, stations (category 1B) not desiring to implement a tournament with echo, but only a tournament without echo, but able in case of need to implement a tournament with echo.

In such a situation, an embodiment of the invention provides for an inter-station casting decision procedure, aimed at determining which stations will be able to compete for access to this radio network and with which tournament mode. On completion of this casting decision procedure a station either will participate in the tournament in echoless mode, or will participate in the tournament in echoless mode, or else will not participate in the tournament and will not therefore be able to send a packet.

In this regard, it is possible to encounter situations in which a station is at one and the same time within voice range of stations implementing a tournament with echo and within voice range of stations implementing a tournament without echo. In this case, the behavior of the station is not specified and will be able to depend on implementation decisions for optimizing performance as a function of the estimation of the state of the system. In such a situation, it may be decided for example that the station will not participate in a tournament, so as not to disturb the neighboring stations.

In a first variant of the casting decision procedure, two signals S3 and S4 are defined, chosen to be distinct from one another.

The signal S3 is used by a station to signify that it desires to start a tournament with echo. The signal S4 is used by a station to signify that it has not heard any signal S3 sent by another station.

These signals S3 and S4 are sent during two successive time intervals T1 and T2.

During the first interval T1:
  a station of category 1B, that is to say which desires to start a tournament without echo, listens to the radio channel;
  a station of category 1A, that is to say which desires to start a tournament with echo, sends the signal S3.
During the second interval T2:
  a station of category 1, which has heard the signal S3 during the first interval T1, does not send any signal;
  a station of category 1B, which has not heard the signal S3, sends the signal S4.

Subsequent to these exchanges, a station which has sent a signal S3 during the first interval T1 and which has not received any signal S4 during the second interval T2 will participate in one and the same tournament with echo (steps G10 to G100). A station of category 1B which has heard the signal S3 during the first interval will be able, if it so desires, to participate in this same tournament by implementing a tournament with echo. The stations of category 2 will not participate in this tournament.

If a station of category 1B has not received any signal S3 during the first interval T1 and has sent the signal S4 during the second interval, then it will participate in a tournament without echo (steps F10 to F100). The stations of category 1A not having sent any signal S3 nor any signal S4, will be able, if they so desire, to participate in this same tournament by implementing a tournament without echo. The stations of category 2 will not participate in this tournament.

In a second variant of the casting decision procedure, three signals S3$b$, S4$b$ and S5$b$ are defined, chosen to be distinct from one another.

The signal S3$b$ is used by a station to signify that it desires to start a tournament, with or without echo. The signal S4$b$ is used by a station to signify that it desires to start a tournament with echo. The signal S5$b$ is used by a station to signify that it has heard a signal S4$b$ sent by another station.

In this second variant, the signals S3$b$, S4$b$, S5$b$ are sent during three successive time intervals T1, T2 and T3.

During the first interval T1 a station of category 1A or 1B, that is to say which desires to start a tournament with or without echo, sends the signal S3$b$.

During the second interval T2:
  a station of category 1A, that is to say which desires to start a tournament with echo, sends the signal S4$b$;
  a station of category 1B, that is to say which desires to start a tournament without echo, listens to the radio channel.

During the third interval T3, a station of category 1, having heard a signal S4$b$, can send the signal S5$b$.

Subsequent to these exchanges, a station which has sent a signal S4$b$ during the second interval T2 or a signal S5$b$ during the third interval T3, can participate in one and the same tournament, which will be a tournament with echo (steps G10 to G100). The stations of category 1B complying with these conditions will be able, if they so desire, to participate in this same tournament by implementing a tournament with echo. The stations of category 2 will not participate in this tournament. In particular, a station of category 1B, which would have heard the signal S4$b$ (therefore situated within voice range of a station of category 1A) without sending the signal S5$b$, would not participate in this tournament.

A station which has not sent any signal S4$b$ during the second interval T2, which has not heard any signal S4$b$ during the second interval T2 nor any signal S5$b$ during the third interval T3, which has sent or heard the signal S3$b$ during the first interval T1 will be able to participate in one and the same tournament, which will be a tournament without echo (steps F10 to F100). The stations of category 1A not having sent any signal S4$b$ nor any signal S5$b$ will be able, if they so desire, to participate in this same tournament by implementing a tournament without echo. The stations of category 2 will not participate in this tournament.

A station which has not heard any signal S4$b$ during the interval T2 and has heard the signal S5$b$ during the interval T3 may be at the intersection of a tournament-with-echo zone and of a tournament-without-echo zone. This station either will participate in a tournament with echo, or will not participate in a tournament.

In both variants, the time interval T1 is chosen preferably in such a way that the sending of a signal S3 or S3$b$ during this interval also makes it possible to avoid the sending of a packet by a station of category 2, which will believe that the signal S3 or S3$b$ corresponds to a packet sending. The time interval T1 is for example chosen to be of smaller duration D than DIFS and starts at the last sending of a packet.

By generalizing the principles of these two variants, the casting decision procedure makes use on the one hand, of signals of a first type indicating that a station desires to participate in a tournament, either in a tournament with echo or in a tournament without echo, and, on the other hand, of signals of a second type indicating that a station has or has not heard one of the signals of the first type. The intervals in which these signals are sent may be more or less numerous and the order of sending of these signals can vary, the essential thing being to be able to determine whether or not a tournament protocol will be used, and whether this protocol will or will not be with echo. Any scheme which, by dichotomy or according to some other logic, makes it possible, on the basis of the signals of the first and of the second type, to determine which is the category of the other stations within voice range and which is the tournament to be implemented between these stations, is therefore also conceivable for the implementation of the casting decision procedure.

At this juncture, use may furthermore be made of additional rules to decide between the stations in situations not resolved by the simple listening to and/or sending of signals of the first or of the second type. For example, by requiring that a tournament with echo have priority with respect to a tournament without echo or vice-versa, in situations where at least one station is at one and the same time within voice range of stations implementing a tournament with echo and within voice range of stations implementing a tournament without echo.

An embodiment of the invention is applicable to WLAN networks and more generally to CSMA/CA networks. Its use is of particularly interest in contexts where numerous stations share access to the radio channel or in the case where it is desired to carry voice or video traffic.

Another case where the application of an embodiment of the invention will particularly be beneficial is in the case of meshed 802.11 networks, that is to say where one or more stations relay the traffic of the others because their ranges are insufficient. In the latter case the risks of the phenomenon of hidden stations are high and an embodiment of the invention will make it possible to obtain good performance despite everything.

An exemplary embodiment of the invention remedies one or more problems, drawbacks or inadequacies of the prior art and/or to afford improvements thereto.

Although the present disclosure has been described with reference to one or more examples, workers skilled in the art will recognize that changes may be made in form and detail without departing from the scope of the disclosure and/or the appended claims.

The invention claimed is:

1. A method of regulating sending, implemented by a station during a tournament for access to a wireless communication network, wherein, according to said tournament, permissions and prohibitions to send data packets are allotted to a plurality of stations by using binary random variables having a Bernoulli distribution, the method comprising, in the course of a selection round of said tournament:
   receiving by said station a first signal, sent by another station and indicating that this other station has during said selection round obtained permission to send a data packet, and
   sending a second signal indicating that said station has received the first signal.

2. The method as claimed in claim 1, in which the method comprises, prior to the implementation of a tournament, implementing by said station a casting decision procedure so as to determine whether or not said station will start a tournament in which any station receiving said first signal must send said second signal.

3. The method as claimed in claim 1, in which the method comprises, prior to the implementation of a tournament, sending by said station a third signal signifying that said station desires to start a tournament in which any station receiving said first signal must send said second signal.

4. The method as claimed in claim 1, in which the method comprises, prior to the implementation of a tournament, sending by said station a fourth signal indicating that said station has received a third signal sent by another station signifying that this other station desires to start a tournament in which any station receiving said first signal must send said second signal.

5. The method as claimed in claim 3, in which the method comprises, prior to said station sending the third signal, sending by said station a signal indicating that said station desires to participate in a tournament.

6. The method as claimed in claim 4, in which the method comprises, prior to said station sending the fourth signal, sending by said station a signal indicating that said station desires to participate in a tournament.

7. The method as claimed in claim 1, in which the method comprises, prior to the implementation of a tournament, sending by said station a fourth signal indicating that said station has not received any third signal signifying that another station desires to start a tournament in which any station receiving said first signal must send said second signal.

8. A non-transitory recording medium readable by a data processor on which is recorded a program comprising program code instructions for execution of a method of regulating sending, implemented by a station during a tournament for access to a wireless communication network, wherein, according to said tournament, permissions and prohibitions to send data packets are allotted to a plurality of stations by using binary random variables having a Bernoulli distribution, the instructions being
   configured to cause the data processor to perform the following steps in the course of a selection round of said tournament:
      receiving by the station a first signal, sent by another station and indicating that this other station has during said selection round obtained permission to send a data packet, and
      sending by the station a second signal indicating that said station has received the first signal.

9. A device for regulating sending, implementing a tournament for access to a wireless communication network, wherein, according to said tournament, permissions and prohibitions to send data packets are allotted to a plurality of stations by using binary random variables having a Bernoulli distribution, the device comprising:
   means for receiving, during a selection round of said tournament, a first signal, sent by another device, indicating that this other device has during said selection round obtained permission to send a packet, and
   means for sending a second signal indicating that said device has received the first signal.

10. The device as claimed in claim 9, comprising means for, prior to the implementation of a tournament, sending a third signal signifying that said device desires to start a tournament in which any device receiving said first signal must send said second signal.

* * * * *